United States Patent
Oshitari et al.

(10) Patent No.: US 10,547,048 B2
(45) Date of Patent: Jan. 28, 2020

(54) ELECTRODE MATERIAL FOR LITHIUM ION BATTERY AND LITHIUM ION BATTERY

(71) Applicant: SUMITOMO OSAKA CEMENT CO., LTD., Tokyo (JP)

(72) Inventors: Satoru Oshitari, Funabashi (JP); Ryuuta Yamaya, Narashino (JP)

(73) Assignee: SUMITOMO OSAKA CLEMENT CO., LTD., Tokyo (JP)

( * ) Notice: Subject to any disclaimer, the term of this patent is extended or adjusted under 35 U.S.C. 154(b) by 14 days.

(21) Appl. No.: 15/928,673

(22) Filed: Mar. 22, 2018

(65) Prior Publication Data

US 2019/0103601 A1 Apr. 4, 2019

(30) Foreign Application Priority Data

Sep. 29, 2017 (JP) .................. 2017-190802

(51) Int. Cl.
| | |
|---|---|
| *H01M 4/136* | (2010.01) |
| *H01M 4/36* | (2006.01) |
| *C01B 25/45* | (2006.01) |
| *H01M 4/58* | (2010.01) |
| *H01M 10/0525* | (2010.01) |

(52) U.S. Cl.
CPC .......... *H01M 4/136* (2013.01); *C01B 25/45* (2013.01); *H01M 4/366* (2013.01); *H01M 4/5825* (2013.01); *H01M 10/0525* (2013.01); *C01P 2006/19* (2013.01)

(58) Field of Classification Search
None
See application file for complete search history.

(56) References Cited

U.S. PATENT DOCUMENTS

| | | | |
|---|---|---|---|
| 2011/0262811 A1 | 10/2011 | Kinoshita et al. | |
| 2014/0255783 A1 | 9/2014 | Takahata et al. | |
| 2015/0325846 A1 | 11/2015 | Kitagawa et al. | |
| 2016/0036042 A1* | 2/2016 | Forbert | C01B 25/45 |
| | | | 429/221 |
| 2016/0111712 A1* | 4/2016 | Oyama | H01M 4/136 |
| | | | 429/221 |
| 2017/0092937 A1 | 3/2017 | Oyama et al. | |
| 2017/0092953 A1* | 3/2017 | Oshitari | H01M 4/661 |

FOREIGN PATENT DOCUMENTS

| | | |
|---|---|---|
| JP | 2010-161038 A | 7/2010 |
| JP | 2015-60799 A | 3/2015 |
| JP | 5928648 B1 * | 6/2016 ............ H01M 4/661 |
| JP | 2017-69042 A | 4/2017 |
| JP | 6168218 B1 | 7/2017 |
| WO | 2013/146168 A1 | 10/2013 |

OTHER PUBLICATIONS

Machine translation of JP-5928648-B1 (Year: 2016).*
European Search Report issued with respect to Application No. 18161742, dated Sep. 4, 2018.

* cited by examiner

*Primary Examiner* — Robert S Carrico
(74) *Attorney, Agent, or Firm* — Greenblum & Bernstein, P.L.C.

(57) ABSTRACT

An electrode material for a lithium ion battery including an active material represented by $LiMPO_4$ (M is at least one selected from the group consisting of Fe, Mn, Co, Ni, Zn, Al, Ga, Mg, and Ca), in which an oil absorption amount for which diethyl carbonate is used (DEC oil absorption amount) is 50 cc/100 g or more and 80 cc/100 g or less, and a ratio (DEC/NMP) of the DEC oil absorption amount to an oil absorption amount for which N-methyl-2-pyrrolidinone is used (NMP oil absorption amount) is 1.3 or more and 1.8 or less.

4 Claims, No Drawings

ELECTRODE MATERIAL FOR LITHIUM ION BATTERY AND LITHIUM ION BATTERY

CROSS-REFERENCE TO RELATED APPLICATIONS

This application claims the benefit of Japanese Patent Application No. 2017-190802 filed Sep. 29, 2017, the disclosure of which is herein incorporated by reference in its entirety.

BACKGROUND OF THE INVENTION

Field of the Invention

The present invention relates to an electrode material for a lithium ion battery and a lithium ion battery.

Description of Related Art

Lithium ion batteries have a higher energy density and a higher power density than lead batteries and nickel-hydrogen batteries and are used in a variety of uses such as small-sized electronic devices such as smartphones, domestic backup power supply, and electric tools. In addition, attempts are underway to put high-capacity lithium ion batteries into practical use for recyclable energy storage such as photovoltaic power generation and wind power generation.

Lithium ion batteries include a cathode, an anode, an electrolytic solution, and a separator. As an electrode material that constitutes the cathode, compounds and the like represented by lithium cobalt oxide ($LiCoO_2$), lithium manganese oxide ($LiMn_2O_4$), and $LiMPO_4$ (M=Fe, Mn, Co, Ni, or the like) are used.

Among the materials represented by $LiMPO_4$ (M=Fe, Mn, Co, Ni, or the like), $LiMnPO_4$ (LMP) and $LiFe_xMn_{1-x}PO_4$ (LFMP) active materials which include Mn as a base compound have a characteristic of having a higher stability derived from a high structural stability and a higher energy density derived from a high battery reaction voltage (4.1 V) compared with oxide-based active materials of the related art such as $LiCoO_2$ and are expected to be put into practical use in the future as active materials for in-car batteries.

Thus far, for the purpose of improving the battery characteristics of LMP and LFMP active materials, an increase in the Li reaction area by the miniaturization of particles, the suppression of structural distortion by the substitution with heterogeneous elements, and the improvement of electron conductivity by the improvement of carbon coating have been underway, and materials developing favorable battery characteristics at a low rate have been reported (for example, Japanese Laid-open Patent Publication No. 2015-60799).

SUMMARY OF THE INVENTION

However, LFMP active materials have a problem of the lack of cycle characteristics and high-rate input characteristics, and these characteristics need to be improved in order to put the materials into practical use.

One of the reasons for the lack of cycle characteristics and high-rate input characteristics of LFMP active materials is the influence of an electrolytic solution retention property around the active material. In a case in which the electrolytic solution retention property around the active material is too weak, the migration of Li ions around the active material becomes slow, and battery reactions are limited, and thus the cycle characteristics or the input characteristics deteriorate. On the other hand, in a case in which the electrolytic solution retention property around the active material is too strong, the active material excessively retains electrolytic solutions, and thus electrolytic solutions that are, originally, supposed to move to a separator or an anode become deficient, the migration of Li ions around the separator or the anode becomes slow, and battery reactions are limited, and thus the cycle characteristics or the input characteristics deteriorate. Furthermore, the portion around the LFMP active material is exposed to a high voltage of 4.1 V or higher during charging, and thus, in a case in which the electrolytic solution retention property around the active material is too strong, the electrolytic solution decomposition amount significantly increases. Since the battery capacity is irreversibly used for the decomposition of electrolytic solutions, the cycle characteristics deteriorate, furthermore, the resistance increases due to the remaining of electrolytic solution-decomposed deposit, and the input characteristics deteriorate.

The present invention has been made in consideration of the above-described circumstances, and an object of the present invention is to provide an electrode material for a lithium ion battery in which the migration of Li ions is excellent all around battery-constituting members, it is possible to suppress the electrolytic solution decomposition amount around LFMP active materials, and it is possible to obtain lithium ion batteries being excellent in terms of cycle characteristics and input characteristics and a lithium ion battery.

As a result of intensive studies for achieving the above-described object, the present inventors and the like found that, the oil absorption amount of an electrode material for a lithium ion battery for which diethyl carbonate is used (DEC oil absorption amount) and the ratio (DEC/NMP) of the DEC oil absorption amount to an oil absorption amount for which N-methyl-2-pyrrolidinone is used (NMP oil absorption amount) are respectively set in specific ranges; the above-described object is achieved. The present invention has been completed on the basis of the above-described finding.

That is, the disclosure of the present application relates to the followings.

[1] An electrode material for a lithium ion battery including an active material represented by $LiMPO_4$ (M is at least one selected from the group consisting of Fe, Mn, Co, Ni, Zn, Al, Ga, Mg, and Ca), in which an oil absorption amount for which diethyl carbonate is used (DEC oil absorption amount) is 50 cc/100 g or more and 80 cc/100 g or less, and a ratio (DEC/NMP) of the DEC oil absorption amount to an oil absorption amount for which N-methyl-2-pyrrolidinone is used (NMP oil absorption amount) is 1.3 or more and 1.8 or less.

[2] The electrode material for a lithium ion battery according to [1], in which the active material represented by $LiMPO_4$ (M is at least one selected from the group consisting of Fe, Mn, Co, Ni, Zn, Al, Ga, Mg, and Ca) is an active material represented by $LiFe_xMn_{1-w-x-y-z}Mg_yCa_zA_wPO_4$ (A is at least one selected from the group consisting of Co, Ni, Zn, Al, and Ga, $0.001 \leq w \leq 0.02$, $0.05 \leq x \leq 0.35$, $0.01 \leq y \leq 0.10$, $0.0001 \leq z \leq 0.001$).

[3] The electrode material for a lithium ion battery according to [1] or [2], in which the active material is coated with a pyrolytic carbonaceous film.

[4] The electrode material for a lithium ion battery according to any one of [1] to [3], in which a specific surface area of the electrode material is 5 m²/g or more and 30 m²/g or less.

[5] The electrode material for a lithium ion battery according to any one of [1] to [4], in which a bulk density of the electrode material is 0.6 g/cc or more and 1.0 g/cc or less.

[6] A lithium ion battery including a cathode, an anode, and an electrolyte, in which the cathode has a cathode mixture layer formed using the electrode material according to any one of [1] to [5].

According to the present invention, it is possible to provide an electrode material for a lithium ion battery in which the migration of Li ions is excellent all around battery-constituting members, it is possible to suppress the electrolytic solution decomposition amount around LFMP active materials, and it is possible to obtain lithium ion batteries being excellent in terms of cycle characteristics and input characteristics and a lithium ion battery.

DETAILED DESCRIPTION OF THE INVENTION

An embodiment of an electrode material for a lithium ion battery of the present invention will be described.

Meanwhile, the present embodiment is a specific description for easier understanding of the gist of the present invention and, unless particularly otherwise described, does not limit the present invention.

Electrode Material for Lithium Ion Battery

An electrode material for a lithium ion battery of the present embodiment (hereinafter, also simply referred to as the electrode material) includes an active material represented by $LiMPO_4$ (M is at least one selected from the group consisting of Fe, Mn, Co, Ni, Zn, Al, Ga, Mg, and Ca), an oil absorption amount for which diethyl carbonate is used (DEC oil absorption amount) is 50 cc/100 g or more and 80 cc/100 g or less, and a ratio (DEC/NMP) of the DEC oil absorption amount to an oil absorption amount for which N-methyl-2-pyrrolidinone is used (NMP oil absorption amount) is 1.3 or more and 1.8 or less.

The electrode material of the present embodiment includes an active material represented by $LiMPO_4$ (M is at least one selected from the group consisting of Fe, Mn, Co, Ni, Zn, Al, Ga, Mg, and Ca). Among these, the active material is preferably an active material represented by $LiFe_xMn_{1-w-x-y-z}Mg_yCa_zA_wPO_4$ (A is at least one selected from the group consisting of Co, Ni, Zn, Al, and Ga, $0.001 \leq w \leq 0.02$, $0.05 \leq x \leq 0.35$, $0.01 \leq y \leq 0.10$, $0.0001 \leq z \leq 0.001$).

Here, A is preferably Co or Zn and more preferably Co.

The average primary particle diameter of the primary particles of the active material is preferably 0.01 µm or more and 5 µm or less and more preferably 0.02 µm or more and 2 µm or less. When the average primary particle diameter is 0.01 µm or more, it is easy to uniformly coat the surfaces of the primary particles of the active material with a pyrolytic carbonaceous film, it is possible to substantially increase the discharge capacity in high-speed charge and discharge, and it is possible to realize sufficient charge and discharge performance. Meanwhile, when the average primary particle diameter is 5 µm or less, it is possible to decrease the internal resistance of the primary particles of the active material, and it is possible to increase the discharge capacity in high-speed charge and discharge of lithium ion batteries.

Here, the average particle diameter refers to the number-average particle diameter. The average primary particle diameter of the primary particles of the active material of the present embodiment can be measured by randomly selecting 100 primary particles, measuring the major axes and the minor axes of the respective primary particles using a scanning electron microscope (SEM), and obtaining the average value thereof.

The shape of the active material is not particularly limited, but preferably at least one selected from the group consisting of a spherical shape, a substantially spherical shape, a barrel shape, a rice grain shape, a cylindrical shape, a substantially cylindrical shape, a cubic shape, and a substantially cubic shape, more preferably a spherical shape, and particularly preferably a truly spherical shape. When the shape of the active material is a truly spherical shape, in the electrode material formed of the secondary particles of the active material, spherical secondary particles are easily formed.

Here, the reason for the shape of the active material being preferably a spherical shape is that it is possible to decrease the amount of a solvent when an electrode material mixture is prepared by mixing the electrode material, a binder resin (binder), and the solvent and the application of the electrode material mixture to an electrode current collector also becomes easy.

In addition, when the shape of the active material is a spherical shape, the surface area of the active material is minimized, and it is possible to minimize the blending amount of the binder resin (binder) added to the electrode material mixture. As a result, it is possible to decrease the internal resistance of an electrode to be obtained.

Furthermore, when the active material has a spherical shape, it becomes easy to closely pack the electrode material when the electrode material mixture is applied to the electrode current collector, and thus the amount of the electrode material packed per unit volume increases. Therefore, it is possible to increase the electrode density, and consequently, it is possible to increase the capacity of lithium ion batteries.

The active material is preferably coated with a pyrolytic carbonaceous film from the viewpoint of improving the electron conductivity of the electrode material. Here, the "pyrolytic carbonaceous film" refers to a carbonaceous film formed by carbonizing an organic compound by means of a thermal treatment.

The thickness (average value) of the pyrolytic carbonaceous film that coats the active material is preferably 0.5 nm or more and 10 nm or less and more preferably 1 nm or more and 3 nm or less. When the thickness of the pyrolytic carbonaceous film is 0.5 nm or more, it is possible to suppress the incapability of forming films having a desired resistance value due to the excessively thin thickness of the pyrolytic carbonaceous film. In addition, it is possible to ensure conductivity suitable for the electrode material. Meanwhile, when the thickness of the pyrolytic carbonaceous film is 10 nm or less, it is possible to suppress the battery capacity per unit mass of the electrode material being decreased.

In addition, when the thickness of the pyrolytic carbonaceous film is 0.5 nm or more and 10 nm or less, it becomes easy to closely pack the electrode material, and thus the amount of the electrode material for a lithium ion battery packed per unit volume increases. As a result, it is possible to increase the electrode density, and high-capacity lithium ion batteries can be obtained.

In the active material, 80% or more of the surfaces of the primary particles of the active material are preferably coated with the pyrolytic carbonaceous film, and 90% or more of the surfaces are more preferably coated with the pyrolytic carbonaceous film. When the coating ratio of the pyrolytic carbonaceous film to the surfaces of the primary particles of the active material is 80% or more, the coating effect of the pyrolytic carbonaceous film can be sufficiently obtained. On the other hand, when the coating ratio of the pyrolytic carbonaceous film is less than 80%, the reaction resistance regarding the intercalation and deintercalation of Li ions increases in places in which the pyrolytic carbonaceous film is not formed when the intercalation and deintercalation reaction of Li ions is caused on the surface of the electrode material.

Meanwhile, the coating ratio of the pyrolytic carbonaceous film can be measured using a transmission electron microscope (TEM), an energy dispersive X-ray microanalyzer (EDX), or the like.

The density of the pyrolytic carbonaceous film, which is computed using a carbon component constituting the pyrolytic carbonaceous film, is preferably 0.3 g/cm$^3$ or more and 1.5 g/cm$^3$ or less and more preferably 0.4 g/cm$^3$ or more and 1.0 g/cm$^3$ or less. The density of the pyrolytic carbonaceous film, which is computed using a carbon component constituting the pyrolytic carbonaceous film, refers to the mass of the pyrolytic carbonaceous film per unit volume in a case in which the pyrolytic carbonaceous film is constituted of carbon alone.

When the density of the pyrolytic carbonaceous film is 0.3 g/cm$^3$ or more, the pyrolytic carbonaceous film exhibits a sufficient electron conductivity. Meanwhile, when the density of the pyrolytic carbonaceous film is 1.5 g/cm$^3$ or less, the content of fine crystals of graphite made of a lamellar structure in the pyrolytic carbonaceous film is small, steric barriers by the fine crystals of graphite are not generated during the diffusion of Li ions in the pyrolytic carbonaceous film. Therefore, there are no cases in which the charge migration resistance increases. As a result, there are no cases in which the internal resistance of lithium ion batteries increases, and the voltage does not drop at a high charge-discharge rate of lithium ion batteries.

The amount of carbon included in the active material coated with the pyrolytic carbonaceous film (pyrolytic carbonaceous film active material) is preferably 0.5% by mass or more and 5% by mass or less, more preferably 0.7% by mass or more and 3.5% by mass or less, and still more preferably 0.8% by mass or more and 2.5% by mass or less.

When the amount of carbon is 0.5% by mass or more, it is possible to ensure conductivity suitable for the electrode material, the discharge capacity at a high charge-discharge rate increases in a case in which lithium ion batteries are formed, and it is possible to realize sufficient charge and discharge rate performance. Meanwhile, when the amount of carbon is 5% by mass or less, the amount of carbon becomes too great, and it is possible to suppress the battery capacity of lithium ion batteries per unit mass of the electrode material for a lithium ion battery being decreased more than necessary.

In addition, the average secondary particle diameter of agglomerated particles formed by the agglomeration of a plurality of the primary particles of the pyrolytic carbonaceous film active material is preferably 0.5 µm or more and 30 µm or less and more preferably 0.8 µm or more and 20 µm or less. When the average secondary particle diameter of the agglomerated particles is 0.5 µm or more, it is possible to produce paste having high dispersibility and high fluidity during the manufacturing of electrodes, and thus electrodes having a uniform structure can be produced, the discharge capacity at a high charge-discharge rate increases in a case in which lithium ion batteries are formed, and it is possible to realize sufficient charge and discharge rate performance.

Meanwhile, when the average secondary particle diameter of the agglomerated particles is 30 µm or less, the sizes of the secondary particles are sufficiently smaller compared with the thickness of an electrode coating, and thus surface unevenness is small, it is possible to produce electrodes capable of making the current distribution uniform, it is possible to increase the discharge capacity at a high charge-discharge rate in a case in which lithium ion batteries are formed, and it is possible to realize sufficient charge and discharge rate performance.

Here, the average secondary particle diameter is a volume-average particle diameter. The average secondary particle diameter of the agglomerated particles can be measured using a laser diffraction and scattering particle size distribution measurement instrument or the like.

The oil absorption amount for which diethyl carbonate is used (DEC oil absorption amount) of the electrode material of the present embodiment is 50 cc/100 g or more and 80 cc/100 g or less, preferably 50 cc/100 g or more and 78 cc/100 g or less, and more preferably 51 cc/100 g or more and 75 cc/100 g or less. When the DEC oil absorption amount of the electrode material is less than 50 cc/100 g, the electrolytic solution retention amount near the electrode material is small, and thus the migration of Li ions is suppressed, and it is not possible to realize sufficient charge and discharge rate performance, and, when the DEC oil absorption amount exceeds 80 cc/100 g, the electrolytic solution retention amount near the electrode material is great, and thus the electrolytic solution decomposition amount increases, it is not possible to realize sufficient cycle characteristics, and the electrolytic solution retention amount into a separator or an anode decreases, and thus the migration of Li ions in the separator or the anode is suppressed, and it is not possible to realize sufficient charge and discharge rate performance.

In addition, when the DEC oil absorption amount is in the above-described range, the electrolytic solution retention amount of the active material becomes a sufficient and necessary amount, the migration of Li ions is excellent all around battery-constituting members, and it is possible to suppress the electrolytic solution decomposition amount around LFMP active materials. Therefore, it is possible to obtain lithium ion batteries being excellent in terms of cycle characteristics and input characteristics.

Meanwhile, the DEC oil absorption amount can be measured using a method according to JIS K5101-13-1 (refined linseed oil method) by changing linseed oil to DEC.

In addition, the oil absorption amount for which N-methyl-2-pyrrolidinone is used of the electrode material of the present embodiment (NMP oil absorption amount) is preferably 35 cc/100 g or more and 60 cc/100 g or less and more preferably 38 cc/100 g or more and 58 cc/100 g or less. When the NMP oil absorption amount of the electrode material is in the above-described range, it is possible to set the ratio (DEC/NMP) of the electrode material in a range described below.

Meanwhile, the NMP oil absorption amount can be measured using a method according to JIS K5101-13-1 (refined linseed oil method) by changing linseed oil to NMP.

The ratio of the DEC oil absorption amount to the NMP oil absorption amount (DEC/NMP) of the electrode material of the present embodiment is 1.3 or more and 1.8 or less, preferably 1.3 or more and 1.75 or less, and more preferably 1.3 or more and 1.7 or less. When the ratio (DEC/NMP) is less than 1.3, the electrolytic solution retention property around the electrode material is too poor with respect to the size of the electrode material, and thus the migration of Li ions is suppressed, and it is not possible to realize sufficient charge and discharge rate performance, and, when the ratio exceeds 1.8, the electrolytic solution retention amount around the electrode material increases, and thus the electrolytic solution decomposition amount increases, and it is not possible to realize sufficient cycle characteristics.

In addition, when the ratio (DEC/NMP) is in the above-described range, the electrolytic solution retention amount of the active material becomes a sufficient and necessary amount, the migration of Li ions is excellent all around battery-constituting members, and it is possible to suppress the electrolytic solution decomposition amount around LFMP active materials. Therefore, it is possible to obtain lithium ion batteries being excellent in terms of cycle characteristics and input characteristics.

The specific surface area of the electrode material of the present embodiment is preferably 5 $m^2/g$ or more and 30 $m^2/g$ or less, more preferably 10 $m^2/g$ or more and 27 $m^2/g$ or less, and still more preferably 14 $m^2/g$ or more and 25 $m^2/g$ or less. When the specific surface area of the electrode material is set in the above-described range, it is possible to set the DEC oil absorption amount and the ratio (DEC/NMP) in the above-described ranges respectively. In addition, when the specific surface area of the electrode material is 5 $m^2/g$ or more, it is possible to increase the diffusion rate of lithium ions in the electrode material, and it is possible to improve the battery characteristic of lithium ion batteries. Meanwhile, when the specific surface area is 30 $m^2/g$ or less, it is possible to maintain the bulk density and the tap density of powder at sufficient values, and the amount of the electrode material for a lithium ion battery packed per unit volume increases. As a result, it is possible to increase the electrode density, and high-capacity lithium ion batteries can be obtained.

Meanwhile, the specific surface areas can be measured using a specific surface area meter (for example, manufactured by MicrotracBEL Corp., trade name: BELSORP-mini,) and the BET method.

The bulk density of the electrode material of the present embodiment is preferably 0.6 g/cc or more and 1.0 g/cc or less and more preferably 0.6 g/cc or more and 0.95 g/cc or less. When the bulk density of the electrode material is set in the above-described range, it is possible to set the DEC oil absorption amount and the ratio (DEC/NMP) in the above-described ranges respectively. In addition, when the bulk density of the electrode material is 0.6 g/cc or more, it is possible to increase the electrode density, and thus it is possible to increase the energy density of lithium ion batteries. Meanwhile, when the bulk density is 1.0 g/cc or less, it is possible to sufficiently retain electrolytic solutions in the electrode material, the migration of Li ions is excellent, and it is possible to realize sufficient charge and discharge rate performance.

Meanwhile, the bulk density can be measured using a method according to test methods for bulk density of fine ceramic powder of JIS R 1628:1997.

Method for Manufacturing Electrode Material

A method for manufacturing an electrode material of the present embodiment has, for example, (A) a step of obtaining an active material, (B) a step of preparing a mixture by adding an organic compound serving as a pyrolytic carbonaceous film source to the active material obtained in the step (A), and (C) a step of putting the mixture into a calcination capsule and calcinating the mixture.

Step (A)

In Step (A), as a method for manufacturing the active material, a method of the related art such as a solid-phase method, a liquid-phase method, or a gas-phase method is used. Specifically, in a case in which the active material is an active material represented by $LiFe_xMn_{1-w-x-y-z}Mg_yCa_zA_wPO_4$ (A is at least one selected from the group consisting of Co, Ni, Zn, Al, and Ga, $0.001 \leq w \leq 0.02$, $0.05 \leq x \leq 0.35$, $0.01 \leq y \leq 0.10$, $0.0001 \leq z \leq 0.001$), the active material can be obtained by hydrothermally synthesizing a slurry-form mixture prepared by mixing a Li source, an Fe source, a Mn source, a Mg source, a Ca source, an A source, a P source, and water using a pressure-resistant airtight container and cleaning the obtained sediment with water.

As the reaction conditions of the hydrothermal synthesis, for example, the heating temperature is preferably 110° C. or higher and 200° C. or lower, more preferably 115° C. or higher and 195° C. or lower, still more preferably 120° C. or higher and 190° C. or lower, and far still more preferably 130° C. or higher and 190° C. or lower. When the heating temperature is set in the above-described range, it is possible to set the specific surface area of the electrode materials to be obtained in the above-described range. As a result, the DEC oil absorption amount and the ratio (DEC/NMP) of the electrode material are in the above-described ranges respectively, and it is possible to exhibit the effects of the present invention.

In addition, the reaction time is preferably 20 minutes or longer and 169 hours or shorter and more preferably 30 minutes or longer and 24 hours or shorter. Furthermore, the pressure during the reaction is preferably 0.1 MPa or more and 22 MPa or less and more preferably 0.1 MPa or more and 17 MPa or less.

The molar ratio of the Li source, the Fe source, the Mn source, the Mg source, the Ca source, the A source, and the P source (Li:Fe:Mn:Mg:Ca:A:P) is preferably 1.8 to 3.5:0.04 to 0.4:0.53 to 0.95:0.01 to 0.12:0.00009 to 0.0015:0.98 to 1.07 and more preferably 2.0 to 3.2:0.045 to 0.36:0.60 to 0.80:0.01 to 0.11:0.0001 to 0.0012:0.99 to 1.05.

As the Li source, for example, at least one selected from the group consisting of hydroxides such as lithium hydroxide (LiOH); inorganic lithium acid salts such as lithium carbonate ($Li_2CO_3$), lithium chloride (LiCl), lithium nitrate ($LiNO_3$), lithium phosphate ($Li_3PO_4$) lithium hydrogen phosphate ($Li_2HPO_4$) and lithium dihydrogen phosphate ($LiH_2PO_4$); organic lithium acid salts such as lithium acetate ($LiCH_3COO$) and lithium oxalate (($COOLi)_2$), and hydrates thereof is preferably used.

As the Fe source, for example, at least one selected from the group consisting of iron compounds such as iron (II) chloride ($FeCl_2$), iron (II) sulfate ($FeSO_4$), and iron (II) acetate ($Fe(CH_3COO)_2$) and hydrates thereof; trivalent iron compounds such as iron (III) nitrate ($Fe(NO_3)_3$), iron (III) chloride ($FeCl_3$), and iron (III) citrate ($FeC_6H_5O_7$); and lithium iron phosphate is preferably used.

As the Mn source, for example, at least one selected from the group consisting of manganese (II) chloride ($MnCl_2$), manganese (II) sulfate ($MnSO_4$), manganese (II) nitrate ($Mn(NO_3)_2$), and manganese acetate ($Mn(CH_3COO)_2$) and hydrates thereof is preferably used.

As the Mg source, for example, at least one selected from the group consisting of magnesium (II) chloride ($MgCl_2$), magnesium (II) sulfate ($MgSO_4$), magnesium (II) nitrate ($Mg(NO_3)_2$), and magnesium (II) acetate ($Mg(CH_3COO)_2$) and hydrates thereof is preferably used.

As the Ca source, for example, at least one selected from the group consisting of calcium (II) chloride ($CaCl_2$), calcium (II) sulfate ($CaSO_4$), calcium (II) nitrate ($Ca(NO_3)_2$), and calcium (II) acetate ($Ca(CH_3COO)_2$) and hydrates thereof and calcium hydroxide ($Ca(OH)_2$) is preferably used.

Examples of the A source include compounds including at least one selected from the group consisting of Co, Ni, Zn, Al, and Ga. Among them, compounds including Co are preferred, and, for example, at least one selected from the group consisting of cobalt (II) chloride ($CoCl_2$), cobalt (II) sulfate ($CoSO_4$), cobalt (II) nitrate ($Co(NO_3)_2$), and cobalt (II) acetate ($Co(CH_3COO)_2$) and hydrates thereof is preferably used.

Examples of the P source include phosphoric acid ($H_3PO_4$), ammonium dihydrogen phosphate ($NH_4H_2PO_4$), diammonium phosphate (($NH_4)_2HPO_4$), and the like.

Step (B)

In Step (B), an organic compound serving as a pyrolytic carbonaceous film source is added to the active material obtained in Step (A), thereby preparing a mixture.

First, a solvent is added to the active material, and then an organic compound is added thereto.

When the solvent is added to the active material, the solid content thereof preferably reaches 5% by mass or more and 55% by mass or less, more preferably reaches 6% by mass or more and 50% by mass or less, and still more preferably reaches 7% by mass or more and 45% by mass or less after the preparation. When the solid content is set in the above-described range, it is possible to set the bulk density of an electrode material to be obtained in the above-described range. As a result, the DEC oil absorption amount and the ratio (DEC/NMP) of the electrode material are in the above-described ranges respectively, and it is possible to exhibit the effects of the present invention.

Examples of the solvent include water; alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethyl formamide, N,N-dimethyl acetoacetamide, and N-methyl pyrrolidone; glycols such as ethylene glycol, diethylene glycol, and propylene glycol, and the like. These solvents may be used singly or in a mixture form of two or more solvents. Among these solvents, a preferred solvent is water.

The amount of the organic compound blended into the active material is preferably 0.15 parts by mass or more and 15 parts by mass or less and more preferably 0.45 parts by mass or more and 4.5 parts by mass or less with respect to 100 parts by mass of the active material when the total mass of the organic compound is converted to a carbon element.

When the amount of the organic compound blended into the active material is 0.15 parts by mass or more, it is possible to set the coating ratio of the surfaces of the active material coated with the pyrolytic carbonaceous film that is generated by a thermal treatment to 80% or more. Therefore, it is possible to increase the discharge capacity at a high charge-discharge rate of lithium ion batteries, and it is possible to realize sufficient charge and discharge rate performance. Meanwhile, when the amount of the organic compound blended into the active material is 15 parts by mass or less, the blending ratio of the active material relatively decreases, and it is possible to suppress the capacity of lithium ion batteries being decreased. In addition, when the amount of the organic compound blended into the active material is 15 parts by mass or less, it is possible to suppress the bulk density of the active material being increased due to the pyrolytic carbonaceous film that excessively supports the active material. Meanwhile, when the bulk density of the active material increases, the electrode density decreases, and the battery capacity of the lithium ion battery per unit volume decreases.

As the organic compound that is used to prepare the mixture, for example, at least one selected from the group consisting of polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, phenol, phenolic resins, glucose, fructose, galactose, mannose, maltose, sucrose, lactose, glycogen, pectin, alginic acid, glucomannan, chitin, hyaluronic acid, chondroitin, agarose, polyethers, polyhydric alcohols, and the like is preferably used.

Examples of the polyhydric alcohols include polyethylene glycol, polypropylene glycol, polyglycerin, glycerin, and the like.

When a low-molecular-weight organic compound such as sucrose or lactose is used, it becomes easy to evenly form the pyrolytic carbonaceous film on the surfaces of the primary particles of the electrode material; however, there is a tendency that the degree of carbonization of the pyrolytic carbonaceous film being obtained by thermal decomposition decreases, and it is difficult to form pyrolytic carbonaceous films capable of sufficiently decreasing resistance. In addition, when a high-molecular-weight organic compound such as polyvinyl alcohol or polyvinyl pyrrolidone is used, there is a tendency that the degree of carbonization of the pyrolytic carbonaceous film being obtained by thermal decomposition increases, and the resistance can be sufficiently decreased; on the other hand, there is a tendency that it becomes difficult to evenly form the pyrolytic carbonaceous film on the surfaces of the primary particles of the electrode material, and there is a problem in that it is difficult to sufficiently decrease the resistance of electrode materials. Therefore, a low-molecular-weight organic compound and a high-molecular-weight organic compound are preferably used in an appropriate mixture form.

Particularly, the low-molecular-weight organic compound is preferably used in a powder form since it is easy to mix the active material and the organic compound and it is possible to obtain electrode materials in which the pyrolytic carbonaceous film is evenly formed on the surfaces of the primary particles of the active material. In addition, unlike the high-molecular-weight organic compound, the low-molecular-weight organic compound is not easily dissolved in the solvent and does not require any preliminary dissolution operation or the like, and thus it is possible to reduce operation steps or reduce costs necessary for the dissolution operation.

Meanwhile, a dispersant may also be added thereto if necessary.

A method for dispersing the active material and the organic compound in the solvent is not particularly limited as long as the active material is uniformly dispersed and the organic compound is dissolved or dispersed. Examples of a device used for the above-described dispersion include medium stirring-type dispersion devices that stir medium particles at a high rate such as a planetary ball mill, an oscillation ball mill, a bead mill, a paint shaker, and an attritor.

Granulated bodies of the mixture may be generated by spraying the slurry using a spray-pyrolysis method in a high-temperature atmosphere, for example, in the atmosphere at 110° C. or higher and 200° C. or lower and drying the slurry.

In the spray-pyrolysis method, in order to generate substantially spherical granulated bodies by rapidly drying the raw material slurry, the particle diameter of a liquid droplet during the spraying is preferably 0.01 µm or more and 100 mm or less.

Step (C)

In Step (C), the mixture obtained in Step (B) is put into a calcination capsule and is calcinated.

As the calcination capsule, for example, a calcination capsule made of a substance having excellent thermal conductivity such as carbon is preferably used.

The calcination temperature is preferably 630° C. or higher and 790° C. or lower and more preferably 680° C. or higher and 770° C. or lower.

When the calcination temperature is 630° C. or higher, the decomposition and reaction of the organic compound sufficiently progresses, and it is possible to sufficiently carbonize the organic compound. As a result, it is possible to form a low-resistance pyrolytic carbonaceous film on the obtained electrode material. Meanwhile, when the calcination temperature is 790° C. or lower, the grain growth in the electrode material does not proceed, and it is possible to maintain a sufficiently large specific surface area. As a result, the discharge capacity at a high charge-discharge rate increases in a case in which lithium ion batteries are formed, and it is possible to realize sufficient charge and discharge rate performance.

The calcination time is not particularly limited as long as the organic compound is sufficiently carbonized and is, for example, 0.1 hours or longer and 100 hours or shorter.

The calcination atmosphere is preferably an inert atmosphere filled with an inert gas such as nitrogen ($N_2$) or argon (Ar) or a reducing atmosphere including a reducing gas such as hydrogen ($H_2$). In a case in which it is necessary to further suppress the oxidation of the mixture, the calcination atmosphere is more preferably a reducing atmosphere.

The organic compound is decomposed and reacted by the calcination in Step (C), and thus carbon is generated. In addition, this carbon is attached to the surface of the active material, thereby producing a pyrolytic carbonaceous film. Therefore, the surface of the active material is coated with the pyrolytic carbonaceous film.

In the present embodiment, in Step (C), it is preferable to add a thermal conduction auxiliary substance having a higher thermal conductivity than the active material to the mixture and then calcinate the mixture. In such a case, it is possible to make the temperature distribution in the calcination capsule during the calcinations more uniform. As a result, it is possible to suppress the generation of portions in which the carbonization of the organic compound is insufficient due to temperature unevenness in the calcination capsule or the generation of portions in which the active material is reduced by carbon.

The thermal conduction auxiliary substance is not particularly limited as long as the thermal conduction auxiliary substance has a higher thermal conductivity than the active material, but is preferably a substance that does not easily react with the active material. This is because, when the thermal conduction auxiliary substance reacts with the active material, there is a concern that the battery activity of the active material to be obtained after the calcination may be impaired or there is a concern that it may become impossible to collect and reuse the thermal conduction auxiliary substance after the calcination.

Examples of the thermal conduction auxiliary substance include carbonaceous materials, alumina-based ceramic, magnesia-based ceramic, zirconia-based ceramic, silica-based ceramic, calcia-based ceramic, aluminum nitride, and the like. These thermal conduction auxiliary substances may be used singly or a mixture of two or more thermal conduction auxiliary substances may be used.

The thermal conduction auxiliary substance is preferably a carbonaceous material. Examples of the carbonaceous material that can be used as a thermal conduction auxiliary agent include graphite, acetylene black (AB), vapor-grown carbon fiber (VGCF), carbon nanotube (CNT), graphene, and the like. These thermal conduction auxiliary substances may be used singly or a mixture of two or more thermal conduction auxiliary substances may be used. Among these carbonaceous materials, graphite is more preferred as the thermal conduction auxiliary substance.

The dimensions of the thermal conduction auxiliary substance are not particularly limited. However, the average of the length of the thermal conduction auxiliary substance in the longitudinal direction is preferably 1 mm or more and 100 mm or less and more preferably 5 mm or more and 30 mm or less from the viewpoint of the thermal conduction efficiency since it is possible to make the temperature distribution in the calcination capsule sufficiently uniform and the amount of the thermal conduction auxiliary substance added is decreased. In addition, when the average of the length of the thermal conduction auxiliary substance in the longitudinal direction is 1 mm or more and 100 mm or less, it becomes easy to separate a thermal conduction auxiliary agent from the electrode material using a sieve.

In addition, the thermal conduction auxiliary substance preferably has a greater specific weight than the electrode material since separation using an air flow-type classifier or the like is easy.

The amount of the thermal conduction auxiliary substance added is also affected by the dimensions of the thermal conduction auxiliary substance; however, in a case in which the content of the mixture is set to 100% by volume, the amount of the thermal conduction auxiliary substance added is preferably 1% by volume or more and 50% by volume or less and more preferably 5% by volume or more and 30% by volume or less. When the amount of the thermal conduction auxiliary substance added is 1% by volume or more, it is possible to make the temperature distribution in the calcination capsule sufficiently uniform. Meanwhile, when the amount of the thermal conduction auxiliary substance added is 50% by volume or less, it is possible to suppress a decrease in the amount of the active material and the organic compound being calcinated in the calcination capsule.

After the calcination, it is preferable to pass the mixture of the thermal conduction auxiliary substance and the electrode material through a sieve or the like and separate the thermal conduction auxiliary substance and the electrode material.

Lithium Ion Battery

A lithium ion battery of the present embodiment is a lithium ion battery having a cathode, an anode, and an electrolyte, in which the cathode has a cathode mixture layer formed using the electrode material.

Cathode

In order to produce the cathode, the cathode material, a binder made of a binder resin, and a solvent are mixed together, thereby preparing a coating material for forming the cathode or paste for forming the cathode. At this time, a conductive auxiliary agent such as carbon black, acetylene black, graphite, Ketjen black, natural graphite, or artificial graphite may be added thereto if necessary.

As the binder, that is, the binder resin, for example, a polytetrafluoroethylene (PTFE) resin, a polyvinylidene fluoride (PVdF) resin, fluorine rubber, or the like is preferably used.

The blending ratio between the cathode material and the binder resin is not particularly limited; however, for example, the amount of the hinder resin is set to 1 part by mass or more and 30 parts by mass or less and preferably set to 3 parts by mass or more and 20 parts by mass or less with respect to 100 parts by mass of the cathode material.

The solvent that is used in the coating material for forming the cathode or the paste for forming the cathode may be appropriately selected depending on the properties of the binder resin.

Examples thereof include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethyleneglycol monoethylether (ethylcellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethylacetoacetamide, and N-methyl pyrrolidone; glycols such as ethylene glycol, diethylene glycol, and propylene glycol, and the like. These solvents may be used singly, or a mixture of two or more solvents may be used.

Next, the coating material for forming the cathode or the paste for forming the cathode is applied onto one surface of an aluminum foil and is then dried, thereby obtaining an aluminum foil having a coated film made of the mixture of the cathode material and the binder resin formed on one surface.

Next, the coated film is pressed by pressure and is dried, thereby producing a current collector (cathode) having a cathode mixture layer on one surface of the aluminum foil.

In the above-described manner, it is possible to produce the cathode in which the discharge capacity can be increased by decreasing the direct current resistance.

Anode

Examples of the anode include anodes including a carbon material such as metallic Li, natural graphite, or hard carbon or an anode material such as a Li alloy, $Li_4Ti_5O_{12}$, or $Si(Li_{4.4}Si)$.

Electrolyte

The electrolyte is not particularly limited, but is preferably a non-aqueous electrolyte, and examples thereof include electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

Separator

The cathode and the anode of the present embodiment can be made to face each other through a separator. As the separator, it is possible to use, for example, porous propylene.

In addition, instead of the non-aqueous electrolyte and the separator, a solid electrolyte may be used.

In the lithium ion battery of the present embodiment, the cathode has a cathode mixture layer formed using the electrode material for a lithium ion battery of the present embodiment, and thus the migration of Li ions is excellent all around battery-constituting members, it is possible to suppress the electrolytic solution decomposition amount around LFMP active materials, the cycle characteristics and the input characteristics are excellent, and the lithium ion battery is preferably used in batteries for driving electric vehicles, batteries for driving hybrid vehicle, and the like.

EXAMPLES

Hereinafter, the present invention will be specifically described using examples and comparative examples. Meanwhile, the present invention is not limited to forms described in the examples.

Example 1

Synthesis of Electrode Material for Lithium Ion Battery

As a Li source and a P source, $Li_3PO_4$, as a Fe source, a $FeSO_4$ aqueous solution, as a Mn source, a $MnSO_4$ aqueous solution, as a Mg source, a $MgSO_4$ aqueous solution, as a Co source, a $CoSO_4$ aqueous solution, and, as a Ca source, a $Ca(OH)_2$ aqueous solution were used, and these were mixed so that the molar ratio (Li:Fe:Mn:Mg:Co:Ca:P) reached 3:0.2448:0.70:0.05:0.0002:0.005:1, thereby preparing 1,000 L of a raw material slurry (mixture).

Next, this mixture was stored in a pressure-resistant airtight container having a capacity of 1,500 L and was heated and reacted at 155° C. for 72 hours. After this reaction, the mixture was cooled to reach room temperature (25° C.), thereby obtaining sediment.

Next, this sediment was sufficiently cleaned with water a plurality of times, thereby obtaining a cake-form active material.

Next, as a solvent, water was added to 5 kg (in terms of solid content) of this active material so that the solid content of the cake-form active material reached 15%. Next, as organic compounds which served as raw materials of a pyrolytic carbonaceous film, 185.9 g of a polyvinyl alcohol aqueous solution, 29.7 g of sucrose powder, and 67.8 g of a phenolic resin solution, the solid content of which had been adjusted to 20% in advance, were used, and a dispersion treatment was carried out thereon for two hours in a bead mill using zirconia balls having a diameter of 1 mm as medium particles, thereby preparing a homogeneous slurry.

Next, this slurry was sprayed in the atmosphere at 150° C. and dried, thereby obtaining granulated bodies of the active material which had an average particle diameter of 9 μm and were coated with an organic substance.

A graphite sintered body having an average length in the longitudinal direction of 10 mm was added as a thermal conduction auxiliary substance to the granulated bodies so that the content thereof reached 5% by volume with respect to 100% by volume of the obtained granulated bodies, and the components were mixed together, thereby obtaining a calcination raw material. 2.5 kg of this calcination raw material was laid in a 10 L graphite capsule, was calcinated for 96 hours at 720° C. in a non-oxidative gas atmosphere, and was then retained at 40° C. for 30 minutes, thereby obtaining a calcinated substance. This calcinated substance was passed through a φ75 μm sieve, and the graphite sintered body was removed, thereby obtaining an electrode material of Example 1.

Production of Lithium Ion Battery

The obtained electrode material, polyvinylidene fluoride (PVdF) as a binder, and acetylene black (AB) as a conductive auxiliary agent were mixed together so that the mass ratio therebetween reached 90:5:5, and furthermore, N-methyl-2-pyrrolidinone (NMP) was added thereto as a solvent so as to impart fluidity, thereby producing a slurry.

Next, this slurry was applied and dried on a 30 μm-thick aluminum (Al) foil (current collector). After that, the product was pressed using a roll calender machine at a total applied pressure of 5 t/250 mm, thereby producing a cathode of Example 1.

Lithium metal was disposed as an anode with respect to the above-obtained cathode for a lithium ion battery, and a separator made of porous polypropylene was disposed between the cathode and the anode, thereby producing a member for a battery.

Meanwhile, ethylene carbonate and diethyl carbonate were mixed together in a mass ratio of 1:1, and furthermore, 1 M of a $LiPF_6$ solution was added thereto, thereby producing an electrolytic solution having lithium ion conductivity.

Next, the member for a battery was immersed in the electrolytic solution, thereby producing a lithium ion battery of Example 1.

Example 2

An electrode material of Example 2 was obtained in the same manner as in Example 1 except for the fact that a raw material slurry was produced and put into a pressure-resistant airtight container and then the heating temperature was changed to 145° C.

In addition, a lithium ion battery of Example 2 was obtained in the same manner as in Example 1 except for the fact that the electrode material of Example 2 was used.

Example 3

An electrode material of Example 3 was obtained in the same manner as in Example 1 except for the fact that a raw material slurry was produced and put into a pressure-resistant airtight container and then the heating temperature was changed to 175° C.

In addition, a lithium ion battery of Example 3 was obtained in the same manner as in Example 1 except for the fact that the electrode material of Example 3 was used.

Example 4

An electrode material of Example 4 was obtained in the same manner as in Example 1 except for the fact that, as a solvent, water was added to 5 kg (in terms of solid content) of the active material so that the solid content of the cake-form active material reached 7.5%.

In addition, a lithium ion battery of Example 4 was obtained in the same manner as in Example 1 except for the fact that the electrode material of Example 4 was used.

Example 5

An electrode material of Example 5 was obtained in the same manner as in Example 1 except for the fact that, as a solvent, water was added to 5 kg (in terms of solid content) of the active material so that the solid content of the cake-form active material reached 40%.

In addition, a lithium ion battery of Example 5 was obtained in the same manner as in Example 1 except for the fact that the electrode material of Example 5 was used.

Comparative Example 1

An electrode material of Comparative Example 1 was obtained in the same manner as in Example 1 except for the fact that a raw material slurry was produced and put into a pressure-resistant airtight container and then the heating temperature was changed to 125° C.

In addition, a lithium ion battery of Comparative Example 1 was obtained in the same manner as in Example 1 except for the fact that the electrode material of Comparative Example 1 was used.

Comparative Example 2

An electrode material of Comparative Example 2 was obtained in the same manner as in Example 1 except for the fact that a raw material slurry was produced and put into a pressure-resistant airtight container and then the heating temperature was changed to 195° C.

In addition, a lithium ion battery of Comparative Example 2 was obtained in the same manner as in Example 1 except for the fact that the electrode material of Comparative Example 2 was used.

Comparative Example 3

An electrode material of Comparative Example 3 was obtained in the same manner as in Example 1 except for the fact that, as a solvent, water was added to 5 kg (in terms of solid content) of the active material so that the solid content of the cake-form active material reached 4%.

In addition, a lithium ion battery of Comparative Example 3 was obtained in the same manner as in Example 1 except for the fact that the electrode material of Comparative Example 3 was used.

Comparative Example 4

An electrode material of Comparative Example 4 was obtained in the same manner as in Example 1 except for the fact that, as a solvent, water was added to 5 kg (in terms of solid content) of the active material so that the solid content of the cake-form active material reached 60%.

In addition, a lithium ion battery of Comparative Example 4 was obtained in the same manner as in Example 1 except for the fact that the electrode material of Comparative Example 4 was used.

The obtained electrode materials were evaluated using the following methods. The results are shown in Table 1.

1. Amount of Carbon

The amount of carbon in the electrode material for a lithium ion battery was measured using a carbon analyzer (trade name: EMIA-220V, manufactured by Horiba Ltd.).

2. Specific Surface Area

The specific surface area of the electrode material for a lithium ion battery was measured using a specific surface area meter (trade name: BELSORP-mini, manufactured by MicrotracBEL Corp.) by means of a BET method in which nitrogen ($N_2$) adsorption was used.

3. Bulk Density Measurement

The bulk density of the powder (electrode material) was measured using a method according to test methods for bulk density of fine ceramic powder of JIS R 1628:1997.

4. NMP Oil Absorption Amount Measurement

The oil absorption amount for which N-methyl-2-pyrrolidinone (NMP) was used was measured using a method according to JIS K5101-13-1 (refined linseed oil method) by changing linseed oil to DEC.

5. DEC Oil Absorption Amount Measurement

The oil absorption amount for which diethyl carbonate (DEC) was used was measured using a method according to JIS K5101-13-1 (refined linseed oil method) by changing linseed oil to DEC.

to the balanced voltage of Li, and, after the voltage reached 4.3 V, constant voltage charging was carried out until the current value reached 0.1 CA. After that, a one-minute break was provided, and then 1 CA constant current discharging was carried out at an ambient temperature of 40° C. until the voltage of the cathode reached 2.5 V with respect to the balanced voltage of Li. This operation was repeated 300 cycles, thereby evaluating the service life. In addition, the ratio of the discharge capacity at the $300^{th}$ cycle to the discharge capacity at the first cycle of the service life evaluation was calculated and considered as the capacity retention.

TABLE 1

| | | Oil absorption amount [cc/100 g] | | Specific surface area [m²/g] | Amount of carbon [% by mass] | Ratio (DEC/NMP) [—] | Powder density [g/cc] | | 3CA constant current charging capacity [mAh/g] | Capacity retention [%] |
|---|---|---|---|---|---|---|---|---|---|---|
| | Composition of active material | NMP | DEC | | | | Bulk | Tap | | |
| Example 1 | $LiFe_{0.2448}Mn_{0.70}Mg_{0.05}Ca_{0.0002}Co_{0.005}PO_4$ | 45.00 | 61.00 | 20.85 | 1.17 | 1.36 | 0.64 | 1.17 | 134 | 84.5 |
| Example 2 | $LiFe_{0.2448}Mn_{0.70}Mg_{0.05}Ca_{0.0002}Co_{0.005}PO_4$ | 52.25 | 78.00 | 24.74 | 1.04 | 1.49 | 0.62 | 1.09 | 138 | 81.2 |
| Example 3 | $LiFe_{0.2448}Mn_{0.70}Mg_{0.05}Ca_{0.0002}Co_{0.005}PO_4$ | 39.75 | 51.50 | 14.96 | 1.03 | 1.30 | 0.75 | 1.35 | 122 | 83.7 |
| Example 4 | $LiFe_{0.2448}Mn_{0.70}Mg_{0.05}Ca_{0.0002}Co_{0.005}PO_4$ | 44.00 | 74.00 | 23.65 | 1.37 | 1.68 | 0.63 | 1.17 | 128 | 81.9 |
| Example 5 | $LiFe_{0.2448}Mn_{0.70}Mg_{0.05}Ca_{0.0002}Co_{0.005}PO_4$ | 42.00 | 68.00 | 21.34 | 1.11 | 1.62 | 0.92 | 1.41 | 125 | 82.1 |
| Comparative Example 1 | $LiFe_{0.2448}Mn_{0.70}Mg_{0.05}Ca_{0.0002}Co_{0.005}PO_4$ | 43.50 | 97.50 | 27.32 | 1.24 | 2.24 | 0.61 | 1.16 | 128 | 76.2 |
| Comparative Example 2 | $LiFe_{0.2448}Mn_{0.70}Mg_{0.05}Ca_{0.0002}Co_{0.005}PO_4$ | 37.75 | 48.25 | 11.89 | 1.09 | 1.28 | 0.91 | 1.41 | 115 | 82.4 |
| Comparative Example 3 | $LiFe_{0.2448}Mn_{0.70}Mg_{0.05}Ca_{0.0002}Co_{0.005}PO_4$ | 66.00 | 94.75 | 22.99 | 1.46 | 1.44 | 0.54 | 0.85 | 123 | 70.5 |
| Comparative Example 4 | $LiFe_{0.2448}Mn_{0.70}Mg_{0.05}Ca_{0.0002}Co_{0.005}PO_4$ | 37.25 | 46.50 | 18.21 | 1.12 | 1.25 | 1.07 | 1.47 | 108 | 80.5 |

6. Ratio (DEC/NMP)

The ratio (DEC/NMP) was calculated from the NMP oil absorption amount measured in Section 4 and the DEC oil absorption amount measured in Section 5.

Evaluation of Lithium Ion Batteries

The obtained lithium ion batteries were evaluated using the following methods. The results are shown in Table 1.

1. 3 CA Constant Current Charging Capacity

The input characteristics of the lithium ion battery were evaluated as described below. Constant current charging was carried out at an ambient temperature of 25° C. and a current value of 3 CA until the voltage of the cathode reached 4.3 V with respect to the balanced voltage of Li, and the capacity was evaluated.

2. Service Life Test (Capacity Retention)

A service life test of the lithium ion battery was carried out as described below.

First, as battery aging, constant current charging was carried out at an ambient temperature of 25° C. and a current value of 1 CA until the voltage of the cathode reached 4.3 V with respect to the balanced voltage of Li, and, after the voltage reached 4.3 V, constant voltage charging was carried out until the current value reached 0.1 CA. After that, a one-minute break was provided, and then 1 CA constant current discharging was carried out at an ambient temperature of 25° C. until the voltage of the cathode reached 2.5 V with respect to the balanced voltage of Li. This operation was repeated three cycles, thereby aging the battery.

After that, constant current charging was carried out at an ambient temperature of 40° C. and a current value of 1 CA until the voltage of the cathode reached 4.3 V with respect Lithium ion batteries for which the electrode material of each of Examples 1 to 5 in which the oil absorption amount for which diethyl carbonate was used (DEC oil absorption amount) was 50 cc/100 g or more and 80 cc/100 g or less and the ratio (DEC/NMP) was 1.3 or more and 1.8 or less were all excellent in terms of cycle characteristics and input characteristics.

What is claimed is:

1. An electrode material for a lithium ion battery comprising:
an active material represented by $LiMPO_4$ (M is at least one selected from the group consisting of Fe, Mn, Co, Ni, Zn, Al, Ga, Mg, and Ca),
wherein
an oil absorption amount for which diethyl carbonate is used (DEC oil absorption amount) is 50 cc/100 g or more and 80 cc/100 g or less,
and a ratio (DEC/NMP) of the DEC oil absorption amount to an oil absorption amount for which N-methyl-2-pyrrolidinone is used (NMP oil absorption amount) is 1.3 or more and 1.8 or less;
wherein the DEC oil absorption amount is as measured in accordance JIS K5101-13-1 wherein linseed oil is substituted with DEC oil, and the NMP oil absorption amount is as measured in accordance JIS K5101-13-1 wherein linseed oil is substituted with NMP oil;
wherein the active material represented by $LiMPO_4$ is an active material represented by $LiFe_xMn_{1-w-x-y-z}Mg_yCa_zA_wPO_4$, wherein A is at least one selected from the group consisting of Co, Ni, Zn, Al, and Ga, $0.001 \leq w \leq 0.02$, $0.05 \leq x \leq 0.35$, $0.01 \leq y \leq 0.10$, $0.0001 \leq z \leq 0.001$; and wherein the active material is coated with a pyrolytic carbonaceous film.

2. The electrode material for a lithium ion battery according to claim 1, wherein a specific surface area of the electrode material is 5 m$^2$/g or more and 30 m$^2$/g or less.

3. The electrode material for a lithium ion battery according to claim 1, wherein a bulk density of the electrode material is 0.6 g/cc or more and 1.0 g/cc or less.

4. A lithium ion battery comprising:

a cathode;

an anode; and an electrolyte, wherein the cathode has a cathode mixture layer formed using the electrode material according to claim 1.

* * * * *

UNITED STATES PATENT AND TRADEMARK OFFICE
CERTIFICATE OF CORRECTION

PATENT NO. : 10,547,048 B2  
APPLICATION NO. : 15/928673  
DATED : January 28, 2020  
INVENTOR(S) : S. Oshitari et al.

Page 1 of 1

It is certified that error appears in the above-identified patent and that said Letters Patent is hereby corrected as shown below:

On the Title Page

Item (73) Assignee (Line 1), please change "CLEMENT" to -- CEMENT --.

Signed and Sealed this  
Twenty-first Day of July, 2020

Andrei Iancu  
*Director of the United States Patent and Trademark Office*